United States Patent [19]

Harriman

[11] Patent Number: 5,373,318
[45] Date of Patent: Dec. 13, 1994

[54] APPARENT SIZE PASSIVE RANGE METHOD

[75] Inventor: Walter L. Harriman, Riverton, N.J.

[73] Assignee: The United States of America as represented by the Secretary of the Navy, Washington, D.C.

[21] Appl. No.: 94,663

[22] Filed: Jul. 15, 1993

Related U.S. Application Data

[63] Continuation-in-part of Ser. No. 921,863, Jul. 27, 1992.

[51] Int. Cl.$^5$ .............................................. H04N 7/18
[52] U.S. Cl. ................................... 348/117; 340/971; 348/140; 348/169
[58] Field of Search ................. 348/169, 140, 117; 340/971; H04N 7/18

[56] References Cited

U.S. PATENT DOCUMENTS

| | | | |
|---|---|---|---|
| 3,162,103 | 12/1964 | Perkins | 354/354 |
| 3,699,310 | 10/1972 | Cole | 235/401 |
| 4,983,033 | 1/1991 | Suzuki | 356/4 |
| 5,001,508 | 3/1991 | Ogawa | 354/403 |
| 5,060,004 | 10/1991 | Ikuta | 354/403 |
| 5,177,462 | 1/1993 | Kajiwara | 348/169 |
| 5,216,480 | 6/1993 | Kaneko | 348/169 |

*Primary Examiner*—Howard W. Britton
*Attorney, Agent, or Firm*—James V. Tura; James B. Bechtel; Susan E. Verona

[57] ABSTRACT

A method and apparatus provides instantaneous passive range measurement onboard an aircraft for determining the range between the aircraft and a target. The target may either be stationary or a slower moving vehicle. Calculation of the desired range is achieved using the formula: Range=(S/S')V(Cos a)(Cos b) where "S"=apparent target size; "S'"=rate of change of apparent size; "V"=ground velocity; "a"=azimuth angle from aircraft heading to target; and "b"=elevation angle from the aircraft heading to the target. The apparatus consists of an automatic video tracker, a video camera, and a servo controlled aiming platform. The video tracker provides target size data. Resolvers on the aiming platform are utilized to determine the azimuth and elevation angles from the aircraft axis to the target. The azimuth angle is added to the aircraft drift angle to determine the total azimuth angle from the aircraft heading to the target. The drift angle and ground velocity are obtained from the aircraft inertial system.

8 Claims, 4 Drawing Sheets

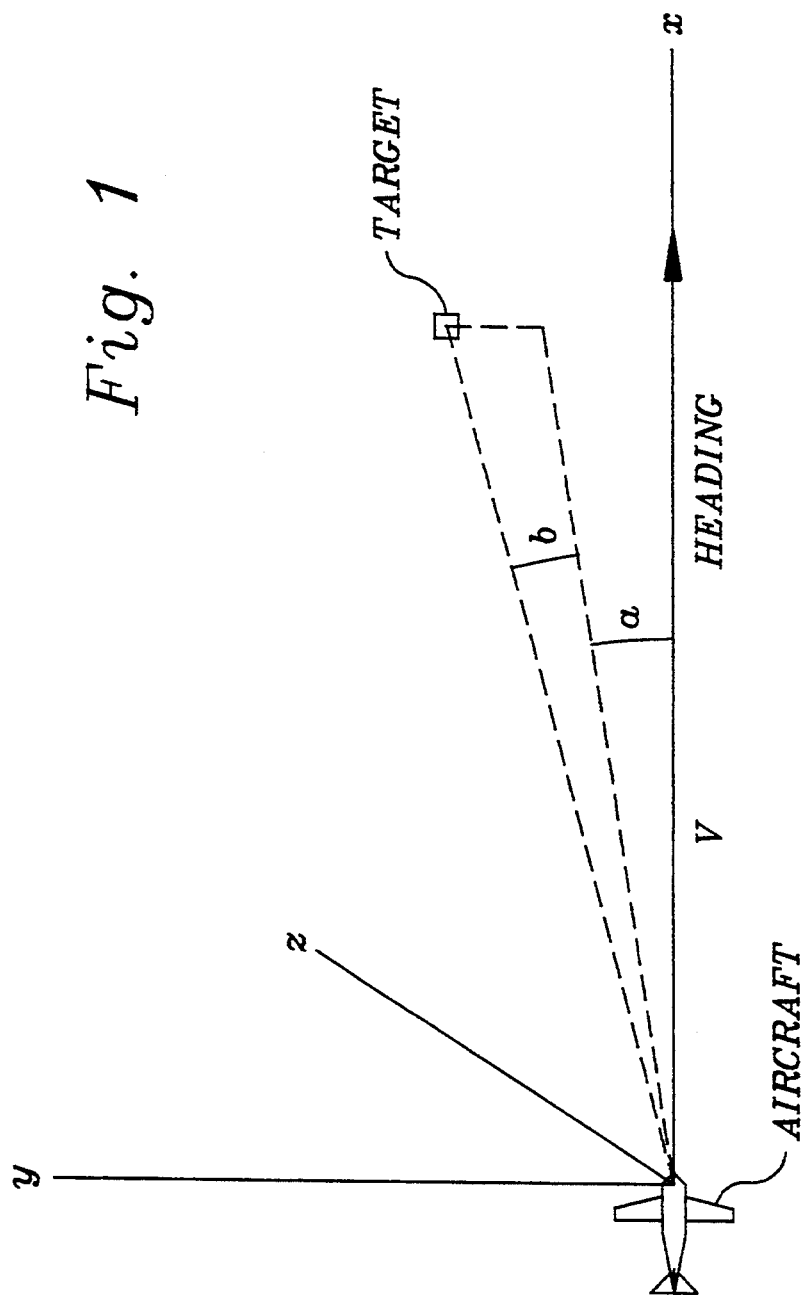

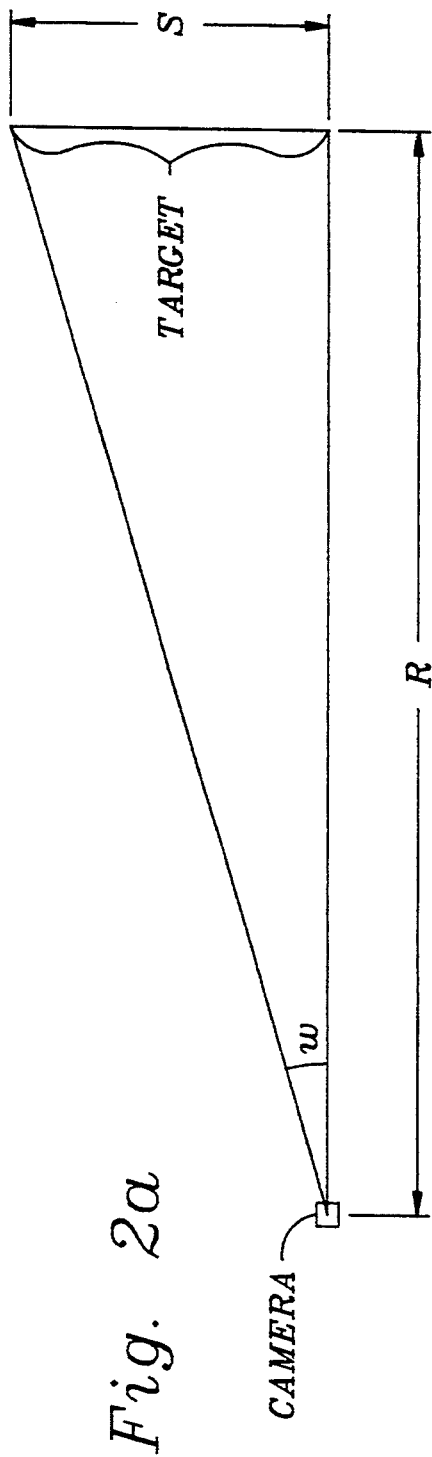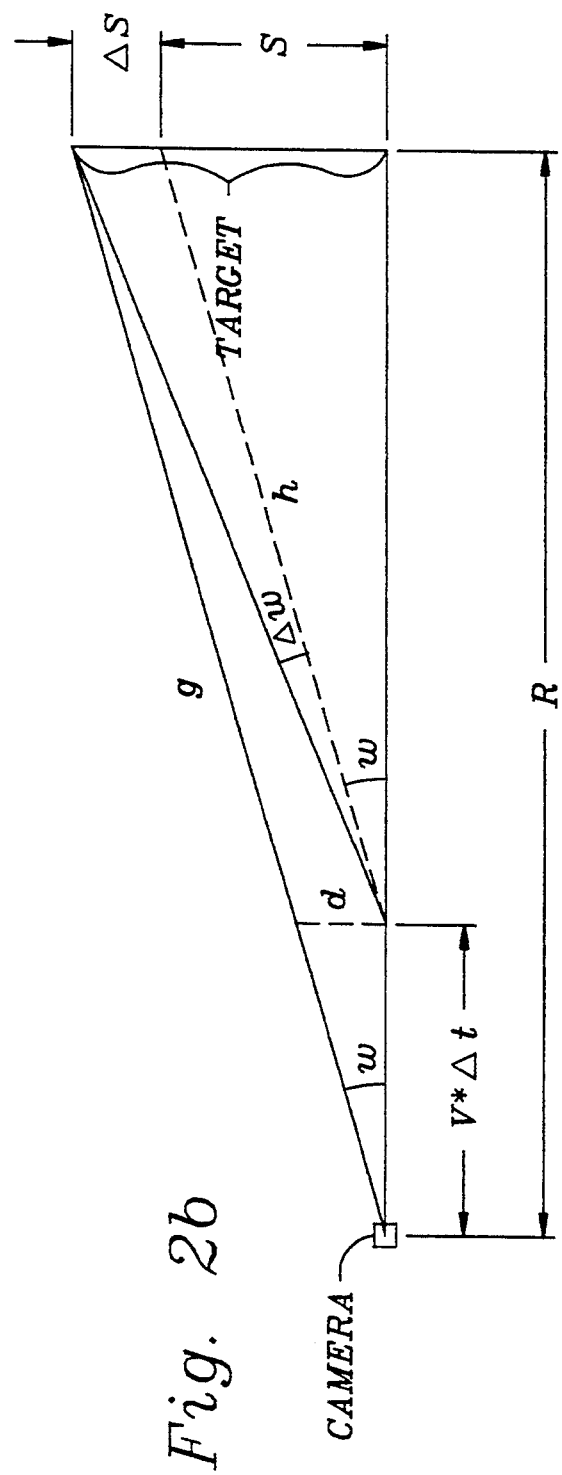
Fig. 2a
Fig. 2b

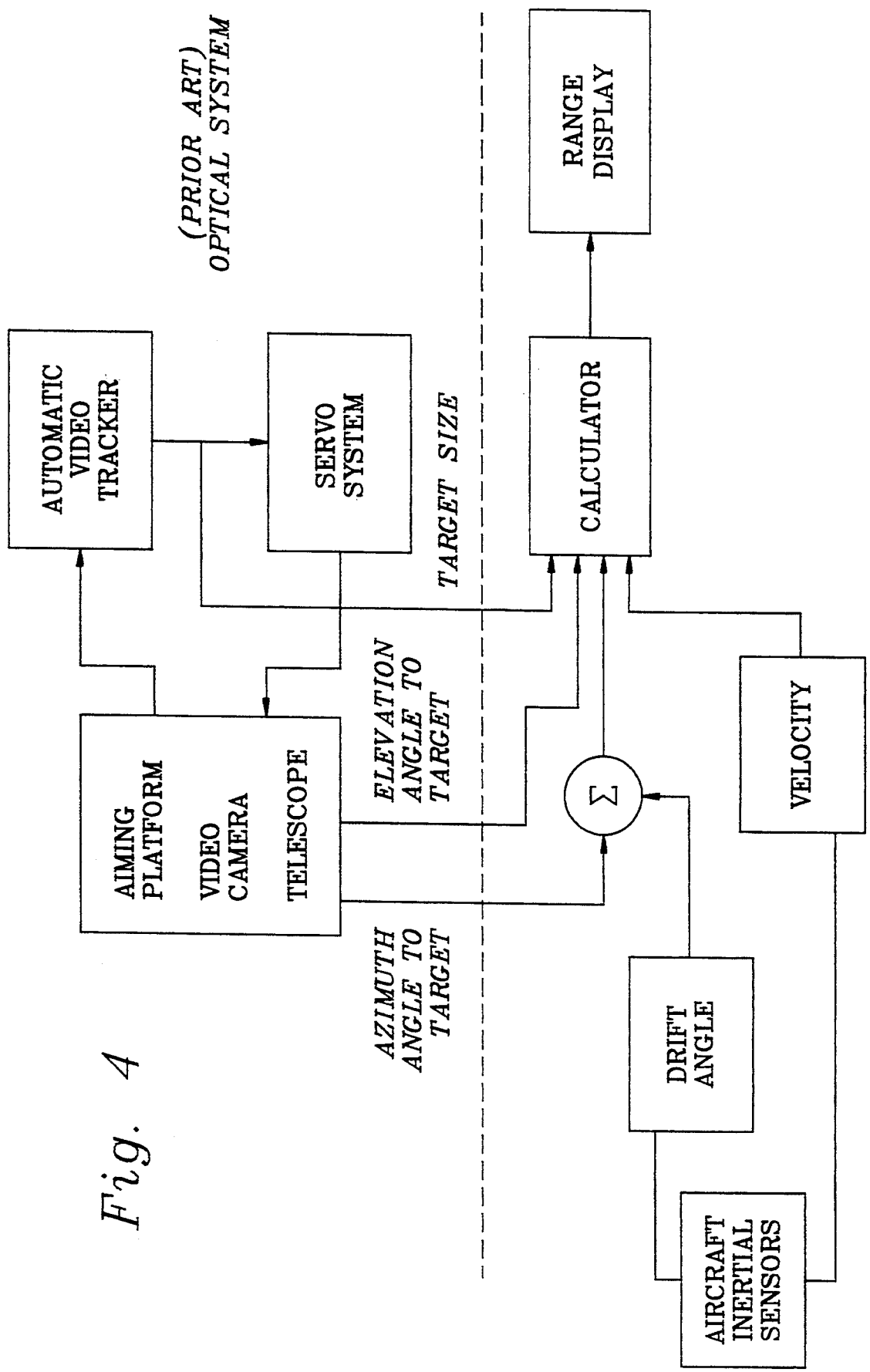
Fig. 4 (PRIOR ART) OPTICAL SYSTEM

APPARENT SIZE PASSIVE RANGE METHOD

STATEMENT OF GOVERNMENT INTEREST

The invention described herein may be manufactured and used by or for the Government of the United States of America for governmental purposes without the payment of any royalties thereon or therefor.

This is a continuation-in-part of application Ser. No. 07/921,863 filed Jul. 27, 1992.

FIELD OF THE INVENTION

This invention relates to range measurement systems. More specifically, this invention relates to an aircraft onboard range measurement system for measuring distances between the aircraft and other objects moving or stationary.

BACKGROUND OF THE INVENTION

Various systems and methods for determining the range between an aircraft and an object on the surface, usually a bombing target, are well-known. These systems fall into two basic categories, active and passive. Active range-finding systems, such as radar and laser emission and detection, are considered "active systems" since they require the transmission of energy. On the contrary, "passive systems" require no such transmissions and are preferred, because it is often desired to make range measurements without the possibility of detection or interfering with other aircraft transmissions and communications.

In the past, range measurement by passive systems has been achieved using triangulation. This requires measuring the angle to the object of interest from two positions spaced a known distance. One problem with aircraft-mounted systems of this type is that the two positions must be relatively close and, hence, the accuracy of measuring long ranges is inadequate. Furthermore, this system requires added complexity since the measurements must be taken from two separate reference points, each of which must be stabilized with regard to the aircraft.

A video tracker is an electronic system that, using a video signal, locks onto a target and tracks it automatically. These devices have been used for a short period of time. A video tracker is designed to keep the image of a target in the center of the video scene. The tracker makes use of the difference in contrast between the target and the background of a video scene to provide error signals. The error signals are sent to a servo controlled aiming platform and the aiming platform moves in the direction required to reduce the error to zero. This keeps the aiming platform pointed at the target and the target positioned at the center of the video scene. The video tracker receives the video signal from a video camera and digitizes the video scene into picture elements called pixels. Normally, the video scene is divided into 512 pixels horizontally and 480 pixels vertically. The tracker keeps track of the number of pixels inside the target.

There have been prior uses of automatic video trackers for supplying information to determine proper ordnance release; however, these have included extremely complicated systems in which range measurement was not required or desired. Such a prior use is described in U.S. Pat. No. 3,699,310 issued to Roy D. Cole, entitled "Angular Rate Bombing System."

The most pertinent other patent prior art of which the applicant is aware includes U.S. Pat. No. 3,162,103 issued to James M. Perkins, entitled "Photographic Method for Locating Objects that Drift at Sea"; U.S. Pat. No. 4,983,033 issued to Koji Suzuki, entitled "Automatic Range Finder for Camera"; U.S. Pat. No. 5,001,508 issued to Kimiski Ogawa, entitled "Range Finder"; and U.S. Pat. No. 5,060,004 issued to Kiyoski Ikuta, entitled "Distance Measuring Device." These additional prior art references are pertinent to the present invention in that they show various range-finding systems. However, none shows the use of an automatic video tracker or use on an air vehicle for determining a range to ground objects or other slower moving vehicles.

SUMMARY OF THE INVENTION

The purpose of this invention is to provide a passive means for measuring range from an airborne aircraft to a surface target using automatic video tracking techniques. The primary application is for the Tactical Optical Surveillance System (TOSS), the Infrared Detection Set (IRDS), and similar systems. These systems are used aboard surveillance aircraft. Range information is needed for camera focusing and for determining the actual size of the targets. Active range sensors cannot be used and hence, the present invention is appropriate because it is passive and the range measurement it provides is instantaneous.

The key element of the present device and range measurement method is the Automatic Video Tracker (AVT). As mentioned above, the AVT holds a selected target at the center of the video frame by means of a servo system which aims the platform. The camera aiming platform is arranged to point out the front or the side of the air vehicle with viewing angles that vary in azimuth and elevation. From an air vehicle flying straight and level, range can be determined from the following equation:

$$R = (S/S')V(\cos a)(\cos b)$$

Where:
R = Range
S = Apparent size
S' = Rate of change of apparent size
V = Aircraft ground velocity
a = Azimuth angle to the target relative to aircraft heading
b = Elevation angle to the target relative to the aircraft.

It can be seen that the above equation requires only the determination of a few variables and it is therefore easy to calculate and accurate. The aircraft drift angle and velocity can be obtained from the existing aircraft inertial systems which contain that information. Since the target size rate of increase S' is used, and not the increase itself, range can be calculated instantaneously using the above formula. This system is also completely passive because it emits no energy transmissions of any kind and operates solely on the reception of light which is reflected from the target.

The invention may be more particularly described as an onboard passive range calculator for an aircraft to determine the distance between the aircraft and a surface target, comprising: an airborne aircraft having a heading and a drift angle, and a velocity relative to the ground; sensor means on the aircraft for determining the heading, drift angle and velocity; and a calculator connected to the sensor means for determining the range between the aircraft and the surface target according to the above-described formula. The apparent size sensor means comprises an automatic video tracker identifying target pixels and providing the apparent size data used in the formula. The aircraft heading relative to the target is determined by the aiming platform azimuth pointing angle available from the aiming platform azimuth resolver which should be added to the aircraft drift angle to determine the true heading, or the value used in the range formula. The elevation angle from the aircraft to the target is determined by the aiming platform elevation pointing angle available from the aiming platform elevation resolver. This value is used directly in the formula.

It is, therefore, an object of the present invention to devise an air vehicle based passive range measurement system which is reliable and accurate.

It is a further object of the present invention to provide such an aircraft range measurement system which is instantaneous and which can be measured automatically without the need for operator input.

It is yet another object of the present invention to achieve passive range measurement between an aircraft and a target utilizing information obtained from the aiming platform and an automatic video tracker mounted on the aircraft.

Other objects and advantages of the present invention will be readily apparent to those of ordinary skill in the art from the following drawings and description of the preferred embodiment.

BRIEF DESCRIPTION OF THE DRAWINGS

FIG. 1 is a diagram which shows how the velocity vector from the aircraft to the target is determined.

FIG. 2a is a diagram, with an aircraft and target in initial positions, showing how range can be calculated. FIG. 2b is a diagram, after time $\Delta t$, showing a change of $\Delta S$ in apparent size.

FIG. 4 is a diagram showing the range measurement calculator of the present invention and how it is connected to the automatic video tracker optical system and existing aircraft flight information.

DETAILED DESCRIPTION OF THE PREFERRED EMBODIMENT

Figure 3:
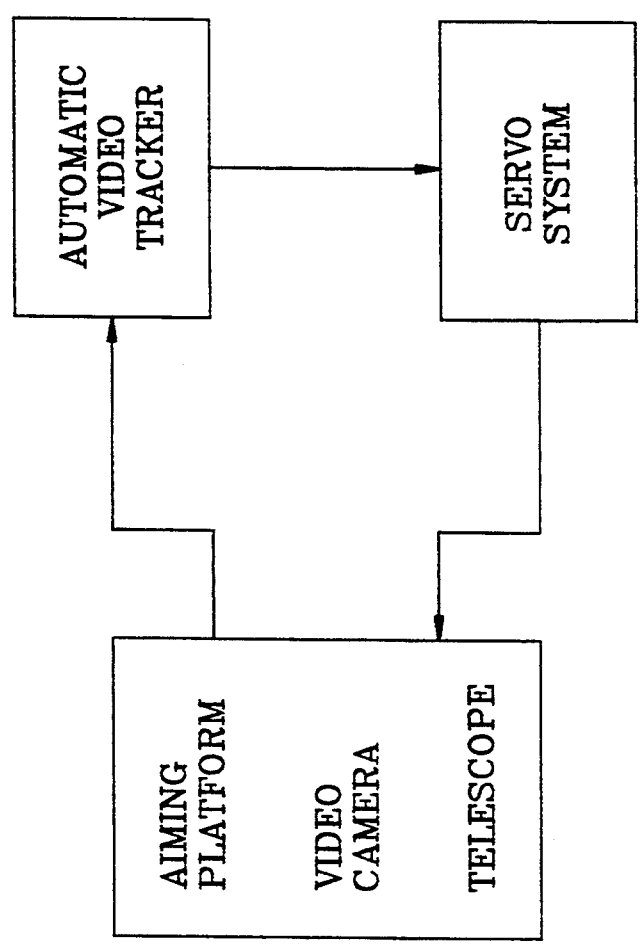
FIG. 3 is a diagram showing a prior art automatic video tracker optical system.

The present invention utilizes the basic equation for determining range as follows:

$$R = (S/S')V(\cos a)(\cos b)$$

The derivation of this equation is as follows. Referring first to FIG. 1. The air vehicle moving along the X axis of a coordinate system in the general direction of the target. The air vehicle velocity vector toward the target is reduced in magnitude. According to the rules of trigonometry, the velocity toward the target $(V^*) = V \cos a \cos b$.

(1) In FIG. 2a, the tangent of the viewing angle (W) subtending the target is the ratio of S to R. As the angle increases, the tangent of the angle increases at an ever increasing rate. Therefore, the range (R) to a given target can be determined from the rate of increase in target size (S).

(2) From FIG. 2b, in the time $\Delta t$, the camera in the aircraft moves a distance $V^*\Delta t$ closer to the target and the viewing angle subtending the target increases by $\Delta W$.

(3) The apparent size of the target increases by $\Delta S$.

(4) From FIG. 2b, $\tan W = d/(V^*\Delta t)$.

(5) Since d and $\Delta S$ are parallel lines between parallel lines g and h, $d = \Delta S$ and $\tan W = \Delta S/(V^* t)$.

(6) From calculus as the values of $\Delta S$ and $\Delta t$ approach zero, the rate of size (S') is obtained and $\tan W = S'/V^*$.

(7) As previously stated: $\tan W = S/R$ then $S/R = S'/V^*$.

(8) By substituting $V(\cos a)(\cos b)$ for $V^*$ as derived from FIG. 1 and solving for R the following range equation is obtained.

Therefore:

$$\text{Range} = (S/S')V(\cos a)(\cos b)$$

In the preferred embodiment, the Passive Range Measurement method of the present invention is used in conjunction with optical systems aboard an aircraft. A typical optical system is shown in FIG. 3. In this example, a conventional video camera and a telescope for long distance viewing are used.

The aiming platform includes a gyro stabilized gimbal to isolate the optics from aircraft motion. Also, resolvers are included for measuring the azimuth and elevation angles to the target relative to the axis of the aircraft.

The scene viewed by the camera can be selected manually with a joystick. When the desired target is acquired, the operator can switch to the automatic tracking mode. This holds the camera on the target and keeps the target at the center of the video scene no matter how the target or background is moving relative to the aircraft motion. This is true as long as the aiming platform remains within its range of motion. The automatic video tracker receives the video signal, digitizes the signal into pixels, and provides target size data. The automatic video tracker of the preferred embodiment is a system sold under the name "ADEPT 20 Automatic Video Tracker," sold by Octec Ltd. The Western Center, Western Road, Bracknell, Berkshire, RG12RW, England.

The integration of the Passive Range Measurement system of the present invention into a typical optical system is shown in FIG. 4. Note that the range measurement system is shown on the bottom half of FIG. 4. The optical system is shown on the top half of FIG. 4. The pointing angles of the optical system relative to the aircraft axis are available from the azimuth and elevation resolvers on the aiming platform. The azimuth angle variable must be added algebraically to the drift angle to obtain the azimuth angle "a" from the aircraft heading to the target. The elevation angle variable "b", the aircraft velocity "V" relative to the earth's surface and the target size "S" are entered directly into the calculation satisfying the Range equation:

$$(\text{Range})R = (S/S')V(\cos a)(\cos b)$$

The aircraft drift angle and velocity can be obtained from the aircraft inertial system.

The size data can be the area of the apparent target since all lines or partial lines within the apparent target are increasing at the same relative rate.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What I claim is:

1. An onboard passive range calculator for an aircraft to determine the distance between the aircraft and a target, comprising:

an airborne aircraft, at a first elevation, having a heading and a drift angle and a velocity relative to the ground;

sensor means on the aircraft for determining the heading, drift angle and velocity; and a calculator connected to said sensor means for determining the range, R, between the aircraft and the target according to the formula:

Range=(S/S')V(Cos a)(Cos b)

WHERE
S=Apparent size
S'=Rate of change of apparent size
V=Aircraft ground velocity
a=Azimuth angle to the target relative to aircraft heading
b=Elevation angle to the target relative to the aircraft.

2. The range calculator of claim 1, wherein said sensor means comprises an automatic video tracker and a gyrostabilized aiming platform aimed at said target and mounted to said aircraft, and an inertial aircraft turning rate sensor.

3. The range calculator of claim 2, wherein said angle to the target relative to the aircraft axis is determined by the output of an aiming platform resolver.

4. The range calculator of claim 3, wherein said range formula includes the aircraft drift angle which is added to the aiming platform pointing angle to determine the true heading and to supply the value of "a" in said range formula.

5. The range calculator of claim 4, wherein said video tracker is Octec model ADEPT 20.

6. The method onboard an aircraft that passively measures the range between the aircraft and a target, comprising the steps of:

determining the true heading of the aircraft with respect to the target;

determining the aircraft ground velocity;

determining the elevation angle between the aircraft and the target; and calculating the range, R, between the aircraft and the target according to the formula:

Range=(S/S')V(Cos a)(Cos b)

WHERE:
S=Apparent size of target
S'=Rate of change of apparent size
V=Aircraft ground velocity
a=Azimuth angle to the target relative to aircraft heading
b=Elevation angle to the target relative to the aircraft.

7. The range measurement method of claim 6, wherein said step of determining the change in apparent size is achieved by using an automatic video tracker onboard the aircraft.

8. The range measurement method of claim 6, wherein the azimuth angle is determined by utilizing the output of the aiming platform azimuth resolver.

* * * * *